US011915674B2

(12) United States Patent
Tagg

(10) Patent No.: US 11,915,674 B2
(45) Date of Patent: Feb. 27, 2024

(54) RESONANCE PODIUM FOR MUSICAL INSTRUMENTS

(71) Applicant: The Trustees of Indiana University, Bloomington, IN (US)

(72) Inventor: David J. Tagg, Bloomington, IN (US)

(73) Assignee: The Trustees of Indiana University, Bloomington, IN (US)

( * ) Notice: Subject to any disclaimer, the term of this patent is extended or adjusted under 35 U.S.C. 154(b) by 143 days.

(21) Appl. No.: 17/604,843

(22) PCT Filed: Apr. 27, 2020

(86) PCT No.: PCT/US2020/030022
§ 371 (c)(1),
(2) Date: Oct. 19, 2021

(87) PCT Pub. No.: WO2020/223138
PCT Pub. Date: Nov. 5, 2020

(65) Prior Publication Data

US 2022/0223123 A1 Jul. 14, 2022

Related U.S. Application Data

(60) Provisional application No. 62/840,695, filed on Apr. 30, 2019.

(51) Int. Cl.
*G10D 3/02* (2006.01)
*G10G 5/00* (2006.01)

(52) U.S. Cl.
CPC ............... *G10D 3/02* (2013.01); *G10G 5/005* (2013.01)

(58) Field of Classification Search
CPC .. G10D 3/02; G10D 1/02; G10D 3/01; G10G 5/005
See application file for complete search history.

(56) References Cited

U.S. PATENT DOCUMENTS

| | | | | |
|---|---|---|---|---|
| 4,018,129 A | | 4/1977 | Hollander | |
| 5,003,858 A | | 4/1991 | Rowell | |
| 5,920,020 A | * | 7/1999 | Korupp .................... | G10D 3/01 84/410 |

(Continued)

FOREIGN PATENT DOCUMENTS

CN 1529305 A 9/2004

OTHER PUBLICATIONS

International Preliminary Report on Patentability received for PCT Patent Application No. PCT/US2020/030022, dated Nov. 11, 2021, 8 pages.

(Continued)

*Primary Examiner* — Kimberly R Lockett
(74) *Attorney, Agent, or Firm* — Faegre Drinker Biddle & Reath LLP

(57) ABSTRACT

A resonance podium includes a plurality of walls defining a frame of the resonance podium. A top panel is coupled to the plurality of walls to form a top surface that supports a performer playing a musical instrument on the resonance podium. A resonant panel is also coupled to the plurality of walls and isolated from the top panel. The resonant panel is configured to receive a portion of the musical instrument and to project structurally-transmitted vibrations from the musical instrument for acoustical amplification.

20 Claims, 14 Drawing Sheets

(56) References Cited

U.S. PATENT DOCUMENTS

| | | | |
|---|---|---|---|
| 2003/0154843 | A1 | 8/2003 | McPherson |
| 2012/0097007 | A1 | 4/2012 | Barillaro |

OTHER PUBLICATIONS

International Search Report and Written Opinion issued by the International Searching Authority, dated Jul. 9, 2020, for International Patent Application No. PCT/US2020/030022; 8 pages.

* cited by examiner

100

RESONANCE PODIUM FOR MUSICAL INSTRUMENTS

CROSS-REFERENCE TO RELATED APPLICATIONS

The present application is a national stage entry of International (PCT) Patent Application Number PCT/US2020/030022, filed Apr. 27, 2020, which in turn claims priority to U.S. Provisional Patent Application No. 62/840,695, filed Apr. 30, 2019, and entitled "RESONANCE PODIUM FOR STRING INSTRUMENTAL SOLOIST" the entire disclosures of which are expressly incorporated by reference herein.

FIELD OF THE DISCLOSURE

The present disclosure generally relates to podiums for musical instruments and, more particularly, to resonance podiums for enhancing the acoustical properties of musical instruments.

BACKGROUND OF THE DISCLOSURE

Traditionally, a riser or podium for a musical instrument, such as a cello, is a hollow wooden box that supports the musical instrument primarily for visual aesthetics. For example, an endpin of the cello drives a resonant top surface of the podium which can play either a constructive or destructive role in both the quality and quantity of the acoustic projection. Despite a performer's performance being visually enhanced by the podium, few studies have examined how the physics, dimensions, and/or acoustic capabilities of the podium can complement the timbre intended by the performer.

One podium design derives from architect Maxwell Kimball in 1963. This particular podium was used several times by cellist Maurice Eisenberg in performances with the New Jersey Symphony. A common problem known to cellists is that most podiums emphasized only the lowest harmonics of the cello and thus sounded rather dull (e.g., lacking in clarity and projection). Although the design attempted to resolve this problem, it still failed to adequately address the projection of the upper frequencies of the cello.

It is a common practice for instrumental soloists to sit on a podium when featured in front of an orchestra. There are also scenarios where a whole section of instrumentalists use a podium for their performance. Conventional podiums have poor acoustical designs and/or are made of poor materials that affect the sound of the musical instruments in nonproductive ways. For example, these podiums are typically made of plywood in the form of an inverted 5-sided box that varies greatly in dimensions. However, most conventional podiums only provide visual aesthetics and/or portability with little to no concerns for the acoustics.

With a cello, a performer typically sits in a chair/bench on a top panel of the podium. The top panel is a single contiguous surface that supports the performer's feet, feet of the chair/bench, and the cello's endpin. As such, the top panel indirectly serves an acoustic function by projecting the structurally-transmitted vibrations of the cello. However, because the vibrations transmitted from the cello through the performer and/or chair/bench are not productive to the acoustic projection, the vibrations have a detrimental effect on the top panel of the podium. This effect, when coupled with the widely-varying dimensions of the podium, generates inconsistent and unproductive acoustic contributions to the sound that the performer is trying to achieve. Moreover, in the case of smaller podiums, the performer is also concerned with the chair/bench sliding off the back end. Accordingly, there remains a need to design better podiums that can enhance the acoustical properties of musical instruments and provide comfort to the performer.

SUMMARY OF THE DISCLOSURE

According to some embodiments, the present disclosure provides a resonance podium that includes a plurality of walls defining a frame of the resonance podium. A top panel is coupled to the plurality of walls to form a top surface that supports a performer playing a musical instrument on the resonance podium. A resonant panel is also coupled to the plurality of walls and isolated from the top panel. The resonant panel is configured to receive a portion of the musical instrument and to project structurally-transmitted vibrations from the musical instrument for acoustical amplification.

According to certain embodiments, the present disclosure provides a resonant panel that includes a first surface and a second surface opposite the first surface. The first surface includes a first brace disposed along a length of the first surface and configured to receive a portion of a musical instrument. The resonant panel is configured to couple to a resonance podium that supports a performer playing the musical instrument and to project structurally-transmitted vibrations from the musical instrument for acoustical amplification.

In some examples, the second surface includes a second brace having a plurality of braces disposed on the second surface in a parallel pattern, a lattice pattern, a concentric pattern, a symmetric pattern, and/or an asymmetric pattern. In certain examples, the first brace includes an interface configured to receive the portion of the musical instrument. As an example, the portion of the musical instrument is an endpin, and the interface includes a plurality of spaced-apart receptacles adapted for receiving the endpin to couple the musical instrument to the resonant panel.

In some examples, the plurality of walls include a front wall, a rear wall, a first sidewall, and a second sidewall opposite the first sidewall. In certain examples, at least one of the plurality of walls includes an opening. For example, the first sidewall includes a first sidewall opening disposed through the first sidewall. As an example, the second sidewall includes a second sidewall opening disposed through the second sidewall. For example, the front wall includes a front wall opening disposed through the front wall. In some examples, the resonant panel is coupled to the plurality of walls via mounting rails. In certain examples, the top panel includes an opening through which the resonant panel is coupled to the plurality of walls.

In some examples, the resonant panel is comprised of a single material. In certain examples, the resonant panel is comprised of two or more different materials. In some examples, the resonant panel is integrated with the frame of the resonance podium, while in certain examples, the resonant panel is a separate piece attachable to the frame of the resonance podium.

According to some embodiments, the present disclosure provides a method of making a resonance podium. The method includes assembling a frame of the resonance podium, where the frame includes a front wall, a rear wall, a first sidewall, and a second sidewall. The method also includes coupling a top panel to the frame to form a top surface that supports a performer playing a musical instrument on the resonance podium. Further, the method includes coupling a resonant panel to the frame. The resonant panel is isolated from the top panel and configured to receive a portion of the musical instrument to project structurally-transmitted vibrations from the musical instrument for acoustical amplification.

Figure 2:
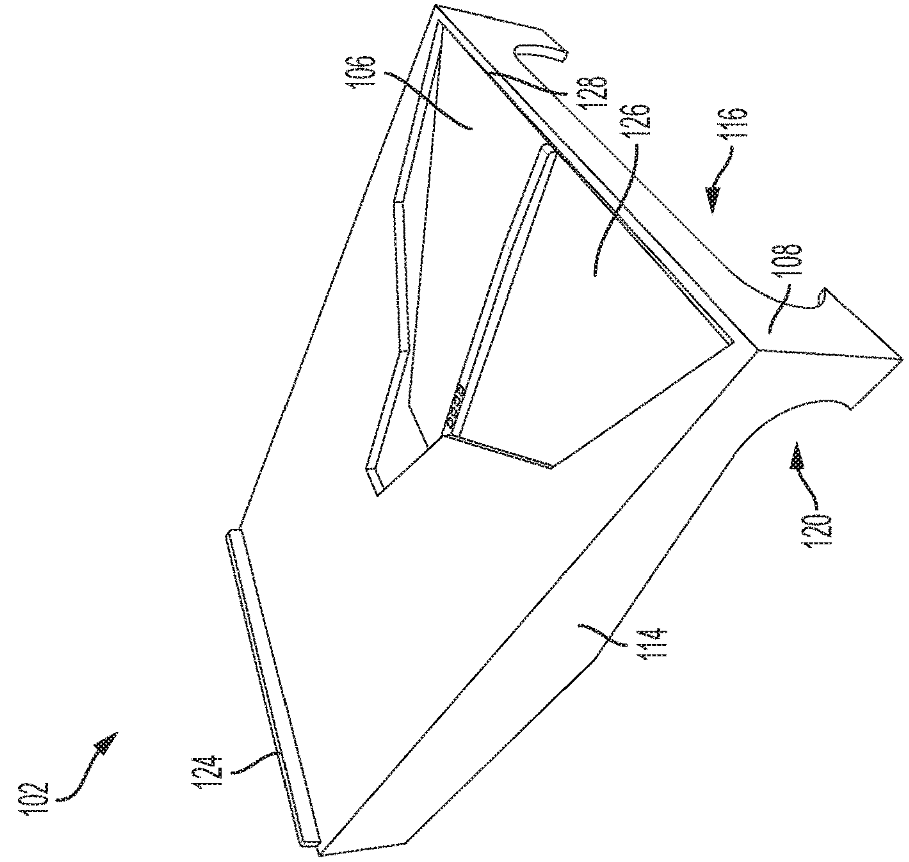
FIG. 2 illustrates a further perspective view of the resonance podium of FIG. 1.

Corresponding reference characters indicate corresponding parts throughout several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the present disclosure, and such exemplifications are not to be construed as limiting the scope of the present disclosure in any manner.

DETAILED DESCRIPTION OF THE DISCLOSURE

For the purposes of promoting an understanding of the principles of the present disclosure, reference is now made to the embodiments illustrated in the drawings, which are described below. The embodiments disclosed herein are not intended to be exhaustive or to limit the disclosure to the precise form disclosed in the following detailed description. Rather, these embodiments are described so that others skilled in the art may utilize their teachings.

To design a resonance podium for a musical instrument such as a cello, it is important to understand the mechanical interactions between a performer, the cello, and a supporting surface of the podium. Studies have shown that the highest concentration of energy is transmitted from an endpin of the cello and that there is little to no useful transmission from the performer to the supporting surface.

Harnessing the energy thorough the endpin of the cello for acoustical amplification is akin to a bridge transmitting vibrations to a soundboard on an instrument with an oscillating string. As such, various musical instruments that utilize bridges, such as concert pianos, concert harps, classical guitars, and hammered dulcimers, were analyzed for their transduction methods and materials. From these studies, several important characteristics were found. First, the choice and structure of the materials should be structurally significant to support the weight or pressure of the vibrating string. Second, the type and shape of the materials should be chosen and shaped in a way to enhance the acoustical output of the structurally-transmitted vibrations. Third, the structure transmitting the sound should impose the smallest possible mass on the vibrating string.

The most successful instrument to exhibit these characteristics is the concert grand piano. While the bridge of the piano is a large structure made of dense wood and metal, the piano overcomes this by using heavy gauge strings that are under high tension to drive the bridge and a large spruce soundboard. The soundboard also varies in width along its length to thereby allow resonances in a wide range of frequencies. In the case of the endpin on the cello, the advantage of this tension driving the soundboard is not present. Instead, only the weight of the cello and the downward pressure induced by the performer are relied upon.

The concert harp has highly tensioned strings and a well-braced bridge connected to a trapezoidal soundboard made of spruce. Like the concert piano, a transition in the width of the trapezoidal soundboard along the length of instrument allows the harp to have a wide range of resonant frequencies. The implementation of a trapezoidal soundboard can also be seen in early lutes and modern hammered dulcimers.

Classical guitar soundboards feature strings under lower tension and with less vibrating mass in comparison to a piano or harp. Again, the soundboard of the guitar supports a wide range of frequencies to be amplified due to the varied width from tip to tail. However, the guitar is less efficient in harnessing the energy due to a small vibrating mass.

For the various musical instruments examined, choosing a suitable material and having a bracing technique are important factors to successfully harness the energy from these instruments. In all the cases, the soundboards were heavily supported and braced at the edges in an effort to maximize the impedance at the interface of support in order to reflect as much energy as possible back into the panel. The goal is to be as light as possible at the top, to be compliant at the edges so as to allow vibrations, and to be as stiff as possible across the majority of the structure to aid in projecting the upper harmonics as well as resisting any twisting or bending motions of the strings on the bridge.

With conventional podiums, a problem exists in that the vibrations transmitted from the musical instrument through the performer generate inconsistent and unproductive acoustic contributions to the sound that the performer is trying to achieve. To solve this problem, the present disclosure proposes a podium design that serves to actively project the structurally-transmitted vibrations of the musical instrument. In particular, the embodiments of the present disclosure describe a resonance podium on which a performer of a cello sits. The resonance podium is a mechanical and passive acoustical device that contains no electronics or artificial amplification. The resonance podium takes an endpin of the cello and couples the endpin to a vibrating resonant panel or "soundboard." The resonant panel is isolated from a surface on which the performer sits to prevent any detrimental effects caused by the performer's body and/or a chair/bench that the performer is sitting on. The endpin of the cello, which carries the weight of the instrument while being performed, is supported by the resonant panel which is mechanically coupled through the endpin. The structurally-transmitted vibrations created by the cello drives the resonant panel, which in turn helps the cello to project acoustically to the surrounding environment.

As described herein, the resonant panel take its design concept from the soundboards found in pianos, harps, classical guitars, or hammered-dulcimers, in the sense that there is a large wooden panel of lightweight material, braced from one side to best enhance and project the vibrations of a string under tension. When used in the resonance podium, the point of the connection with the cello is under significantly less pressure or tension as it would with a piano or harp. As such, special attention is paid to create the resonant panel with the following characteristics. First, the resonant panel needs to be as light as possible to allow the vibrations to be amplified through the endpin of the cello. In some examples, this is accomplished by using European Sitka spruce because of its combined properties in rigidity, regularly-spaced grain, and overall low density. Second, the resonant panel needs to be compliant to vibrational movements so that energy from the cello can be transmitted to the air, but stiff enough to support the weight of the cello and resonate across a broad spectrum of frequencies. In some examples, this is accomplished by using a variety of braces on the back side of the resonant panel constructed from laminated layers of wood, carbon fiber, and/or other synthetic materials (e.g., Kevlar, Nomex). Third, the interface where the resonant panel is supported by the frame of the resonance podium needs to be as rigid as possible so that vibrational energy is reflected back into the resonant panel and not lost or damped by the frame.

In certain embodiments, the resonant panel is not permanently installed in the resonance podium. Instead, the resonant panel is interchangeable depending on the acoustic needs of different instruments and/or performers. Although the present disclosure is described in the context of cellos, it is understood that the present disclosure is applicable to other musical instruments having endpins or end-rests such as double basses, harps, wind instruments, etc.

Figure 1:
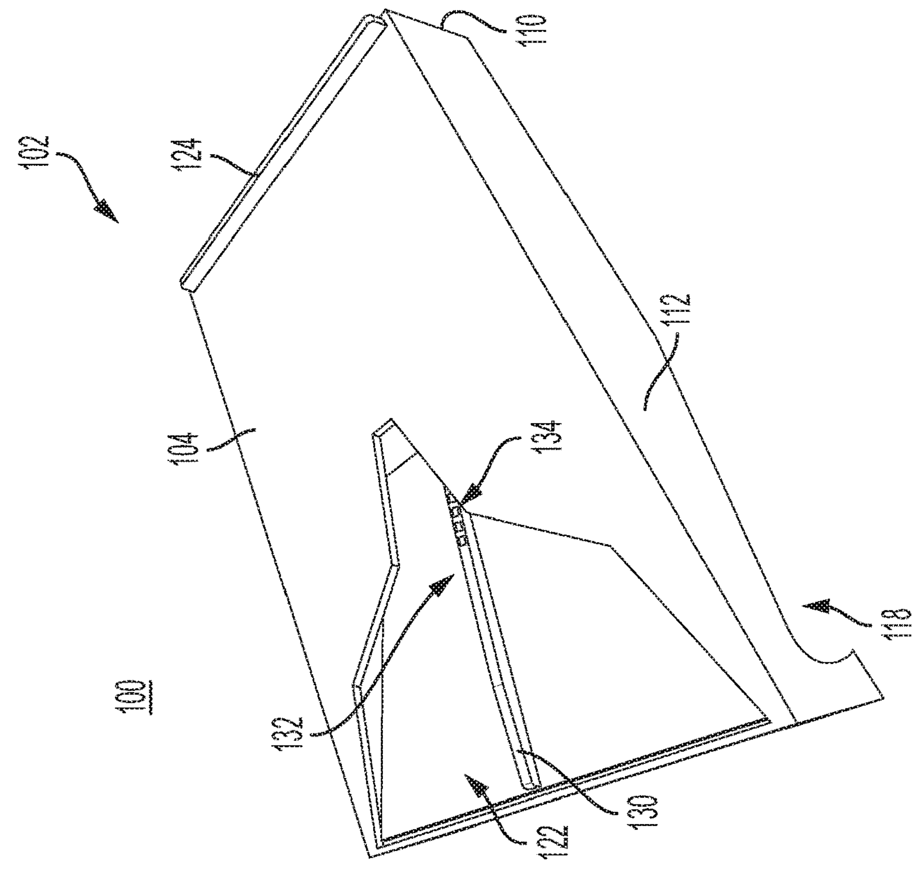
FIG. 1 illustrates a perspective view of a resonance podium.

Referring to FIGS. 1 and 2, a resonance podium 100 is shown that includes a frame 102, a top panel 104, and a resonant panel 106. The frame 102 is a support structure defined by a plurality of walls including a front wall 108, a rear wall 110, a first sidewall 112, and a second sidewall 114. The front wall 108 is opposite the rear wall 110, while the first sidewall 112 is opposite the second sidewall 114. The top panel 104 is coupled to the walls to form an inverted 5-sided box with the $6^{th}$ side being open and facing the floor. In this manner, the top panel 104 provides a support surface on which a performer can sit or stand while playing a musical instrument. The resonant panel 106 is isolated from the top panel 104 and configured to project structurally-transmitted vibrations from the musical instrument for acoustical amplification.

According to certain embodiments, at least some of the walls have ports or openings to promote acoustical projection. Depending on the desired design and/or acoustic response, some or all of these openings may not be needed. For example, at least one of the walls has an opening. As an example, the front wall 108 includes a front wall opening 116 disposed through the front wall, the first sidewall 112 includes a first sidewall opening 118 disposed through the first sidewall, and the second sidewall 114 includes a second sidewall opening 120 disposed through the second sidewall. In some embodiments, the rear wall 110 includes an opening. According to various embodiments, any combination of walls may have openings. For example, the front wall 108 and the rear wall 110 have openings. As an example, the rear wall 110 and the sidewalk 112, 114 have openings. For example, only the sidewalk 112, 114 have openings. As an example, only one of the sidewalk 112, 114 has an opening. For example, only one of the sidewalk 112, 114 and the front wall 108 have openings. As an example, only one of the sidewalk 112, 114 and the rear wall 110 have openings. For example, all of the walls 108-114 have openings.

In some embodiments, the front wall opening 116 is an oval-shaped hole that serves to promote acoustical projection to the front of the podium. In certain embodiments, the first and second sidewall openings 118, 120 are teardrop-shaped holes that serve to promote acoustical projection to the sides of the podium. It is appreciated that other shapes, sizes, and locations for the wall openings may be contemplated in other embodiments.

According to some embodiments, the top panel 104 includes an opening 122 through which the resonant panel 106 is disposed and coupled to the walls of the frame. For example, the opening 122 is a trapezoidal-shaped aperture that corresponds to the shape of the resonant panel 106. However, any suitably shaped opening corresponding to a shape of the resonant panel may be contemplated in other embodiments.

According to certain embodiments, the top panel 104 includes a chair rail 124 disposed in a rear end of the top panel. For example, the chair rail 124 is disposed across the top of the rear wall 110. The chair rail 124 serves to prevent the performer's chair/bench from moving beyond and sliding off the back of the podium.

Figure 17:
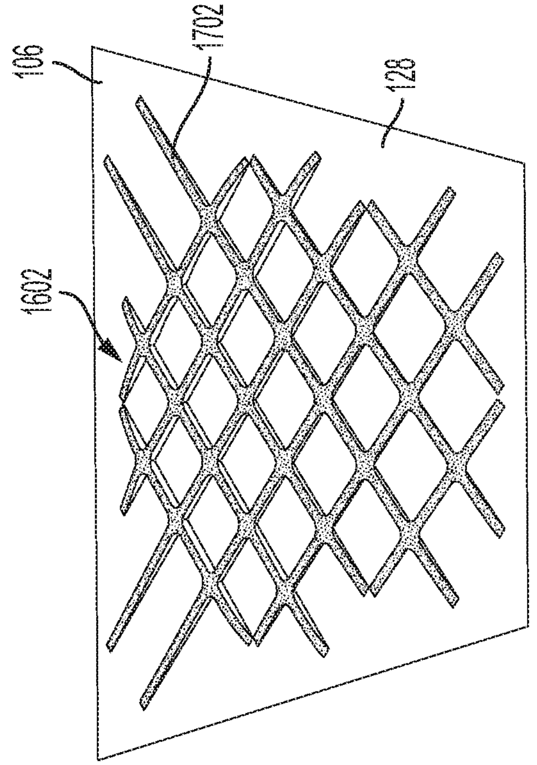
FIG. 17 illustrates a perspective view of the bottom-side brace of FIG. 16 coupled to a resonant panel.
Figure 19:
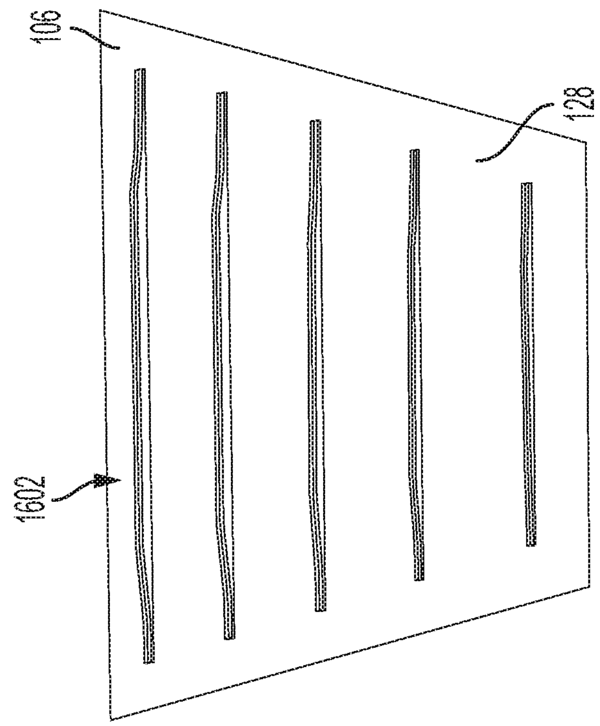
FIG. 19 illustrates a perspective view of the bottom-side brace of FIG. 18 coupled to a resonant panel.

According to some embodiments, the resonant panel 106 includes a top-side surface 126 and a bottom-side surface 128 (see FIGS. 17 and 19). To couple the musical instrument to the resonant panel 106, a top-side brace 130 is disposed on the top-side surface 126. For example, the top-side brace 130 is disposed along a length of the top-side surface 126. The top-side brace 130 includes an interface 132 with a plurality of spaced-apart receptacles 134 configured to receive a portion of the musical instrument. As an example, the portion of the musical instrument is an endpin of a cello, and each of the plurality of receptacles 134 is adapted to receive the endpin to couple the cello to the resonant panel 106 to effectively extend or double the surface area of the cello. In some examples, the resonant panel 106 is made from European Sitka spruce with a thickness of 5-7 mm.

Figure 4:
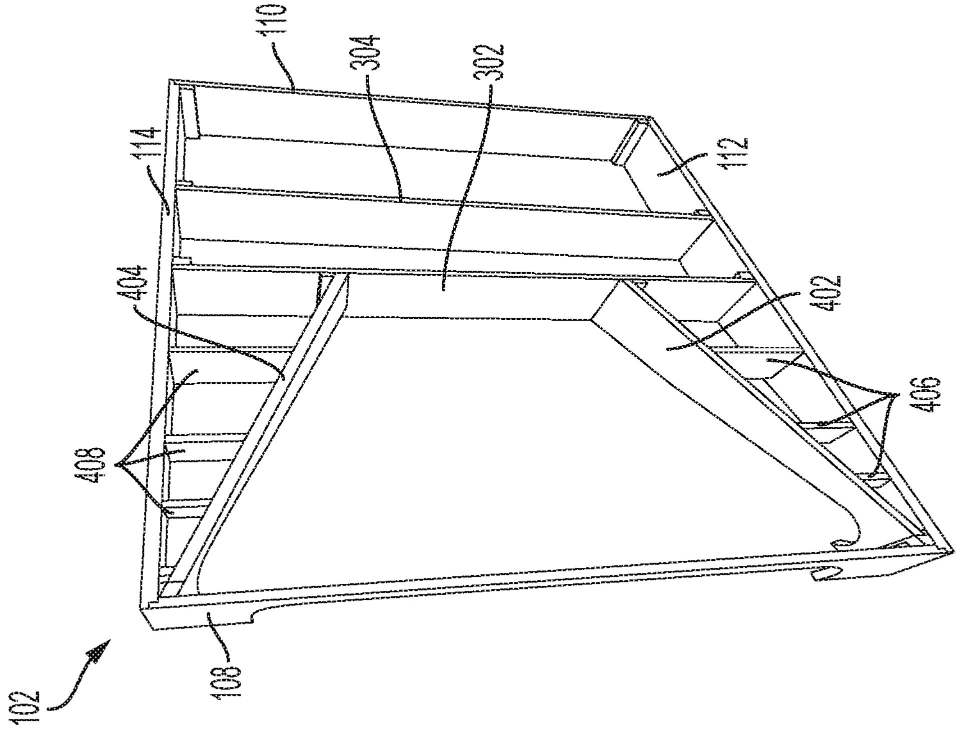
FIG. 4 illustrates a perspective view of the frame of FIG. 3 with mounting rails.
Figure 3:
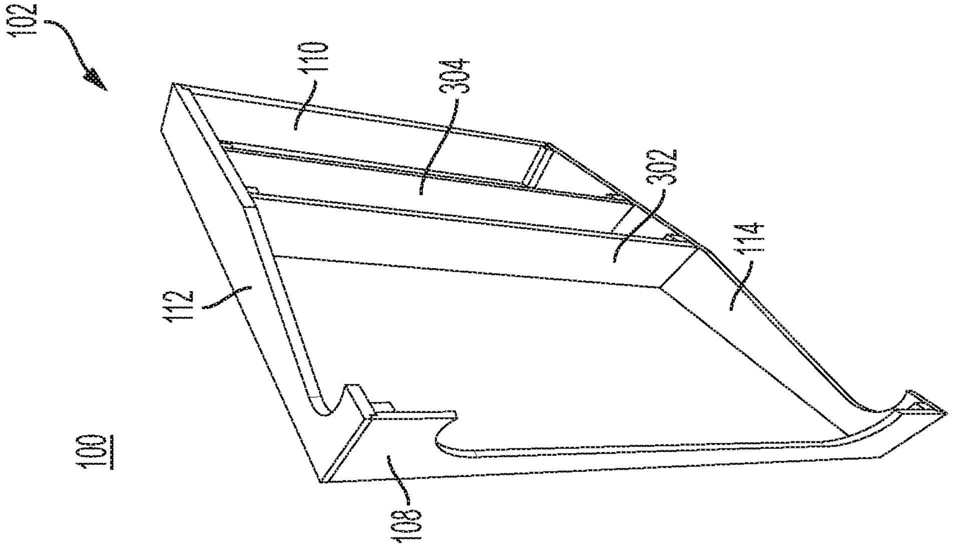
FIG. 3 illustrates a perspective view of a frame of a resonance podium.

FIGS. 3-8 show the fabrication of the resonance podium 100. According to various embodiments, the components of the podium 100 are assembled using any suitable fastening means such as screws, nails, bolts, adhesives, etc. In FIGS. 3-4, the frame 102 is constructed by using the external walls 108-114 as well as internal walls 302, 304, which provide support to weights placed on the frame (e.g., weight of the performer). In some embodiments, the various walls of the frame 102 are made from dense and rigid materials that are stable with temperature and humidity changes such as different types of plywood (e.g., a 9-layer birch/poplar plywood, a 13-layer all-Russian birch plywood, etc.).

In FIG. 4, mounting rails 402, 404 are constructed and disposed between the front wall 108 and internal wall 302 by using respective support walls 406, 408 that heavily brace the mounting rails to create a stable and rigid structure that can reflect vibrational energy back into the resonant panel. As an example, the mounting rails 402, 404 are made from maple hardwood. The resonant panel 106 is coupled to the walls of the frame 102 via the mounting rails 402, 404. As such, the mounting rails 402, 404 are sized to receive the resonant panel 106 and to couple the resonant panel to the walls of the frame 102. In this manner, the resonant panel is contained within and supported by the frame at the front of the resonance podium. This arrangement allows the performer to be isolated from the surface that supports the cello, thereby eliminating any damping effects of the performer's chair and feet.

Figure 7:
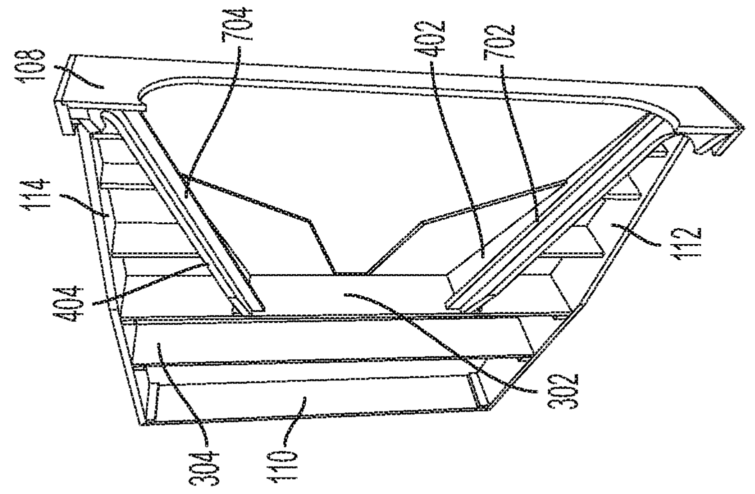
FIG. 7 illustrates a bottom perspective of the frame of FIG. 4 with a top panel.
Figure 6:
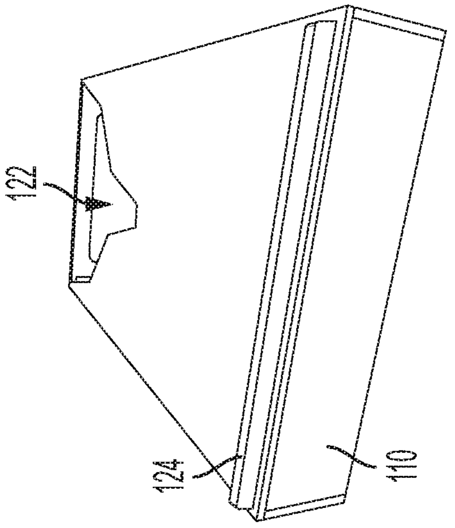
FIG. 6 illustrates a rear perspective view of the frame of FIG. 4 with a top panel.
Figure 5:
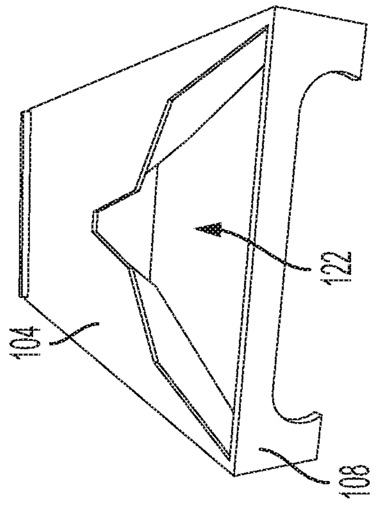
FIG. 5 illustrates a front perspective view of the frame of FIG. 4 with a top panel.
Figure 8:
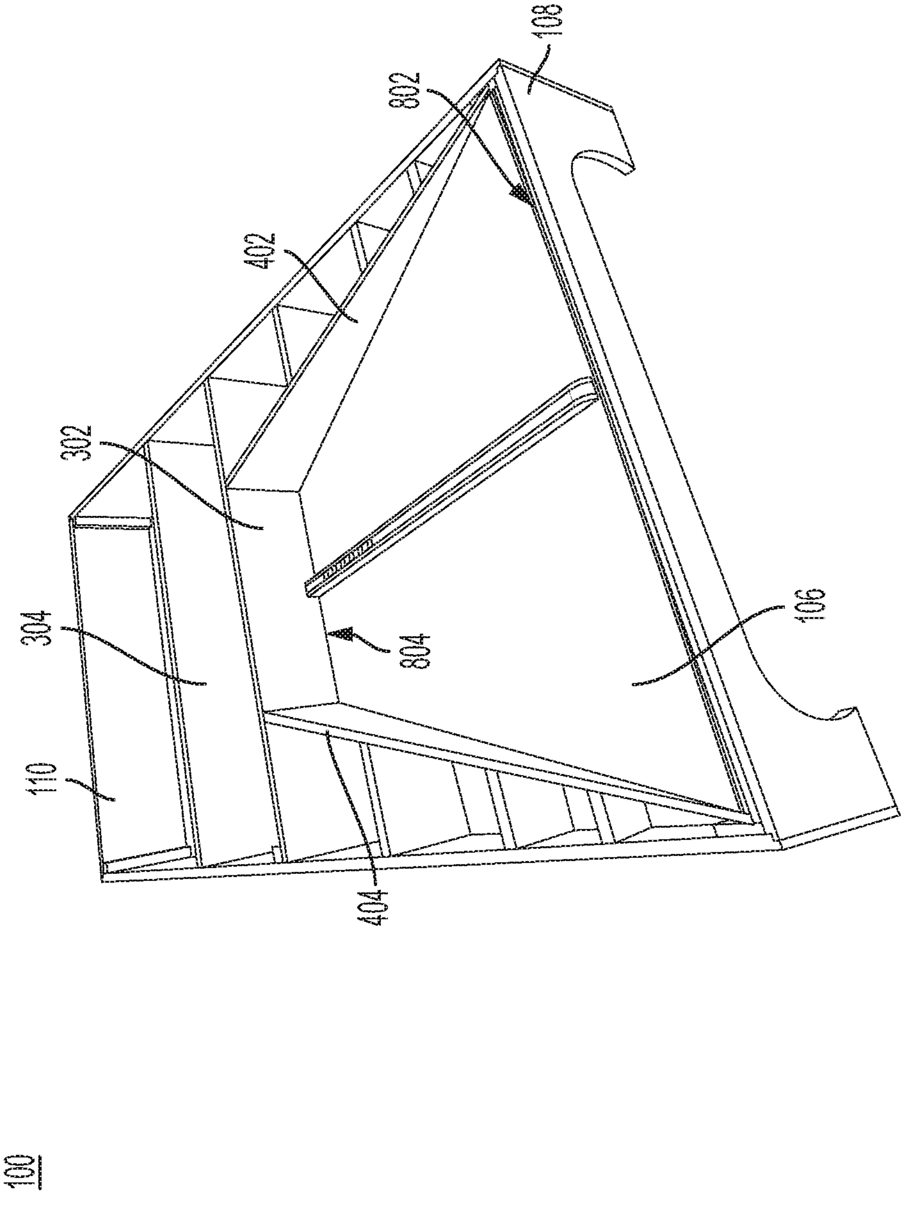
FIG. 8 illustrates a perspective view of the frame of FIG. 4 with a resonant panel.

In FIGS. 5-7, the top panel 104 is constructed and coupled to the frame 102, while in FIG. 8, the resonant panel 106 is constructed and coupled to the frame 102. FIGS. 5-6 also show the chair rail 124 disposed across the top of the rear wall 110. In FIG. 7, ledges 702, 704, upon which the resonant panel 106 rests, are shown on the mounting rails 402, 404, respectively. FIG. 8 shows the resonant panel 106 between the mounting rails 402, 404 without the top panel 104. An air gap 802 exists between the front of the resonant panel 106 and the front wall 108, while an air gap 804 exists between the rear of the resonant panel 106 and the internal wall 302. These air gaps allow for vibrational movements of the resonant panel. The resonant panel 106 has inherent flexibility for acoustical amplification. In some embodiments, a stiffer panel construction is used to help emphasize higher frequencies and better clarity of the tone, but potentially at the expense of having attenuated acoustical outputs. The resonant panel 106 is structurally isolated from the top panel 104. In some embodiments, the resonant panel 106 is integrated with the frame of the resonance podium 100. In certain embodiments, the resonant panel 106 is a separate or independent piece attachable to the frame of the resonance podium 100.

Figure 9:
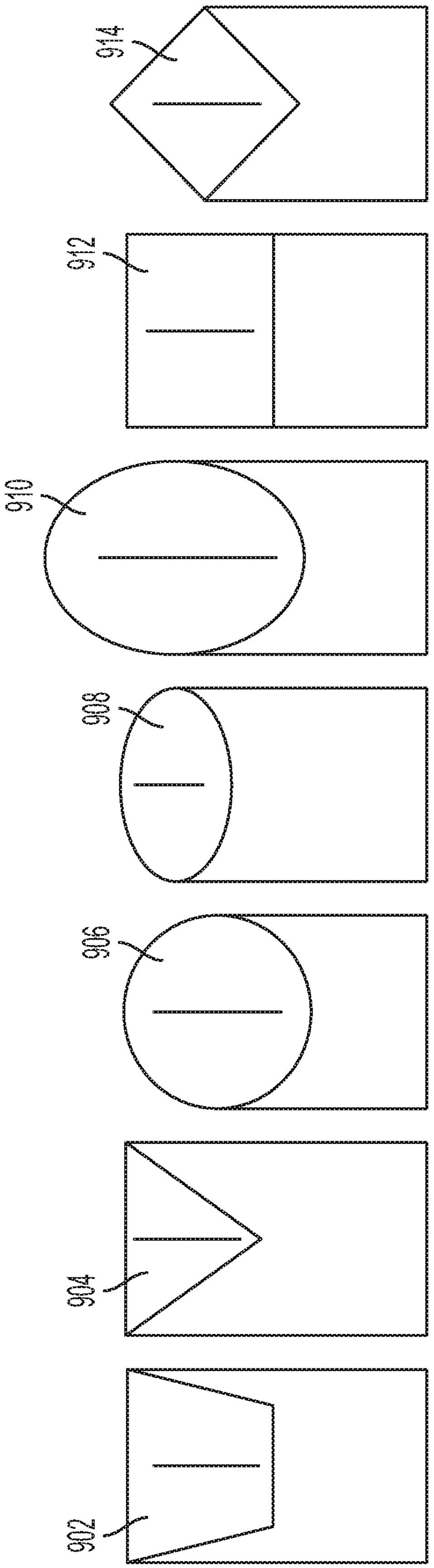
FIG. 9 illustrates different configurations of a resonance podium.
Figure 10:
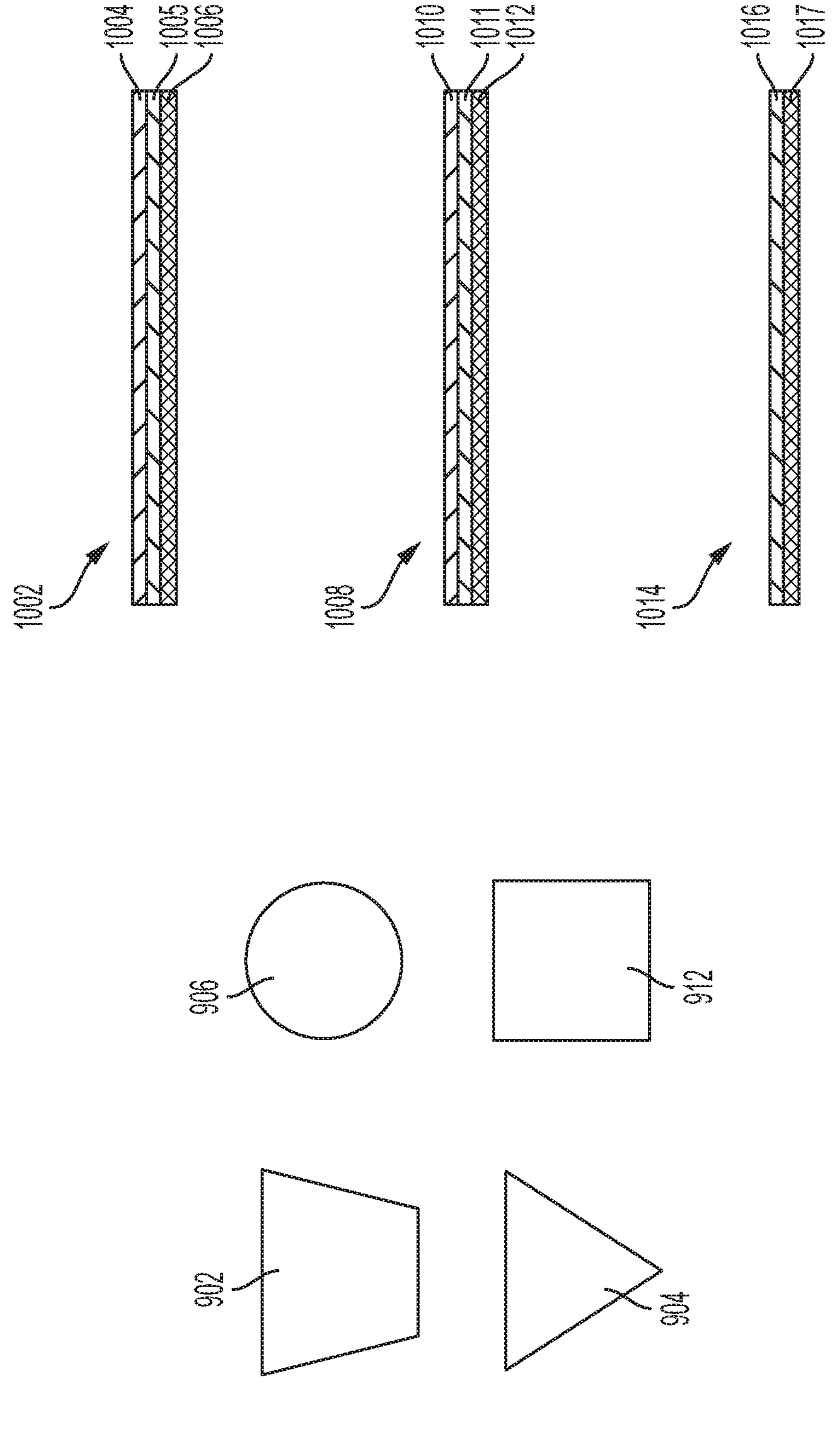
FIG. 10 illustrates different configurations of a resonant panel.

Referring to FIGS. 9 and 10, different configurations of a resonance podium fitted with various resonant panel shapes are shown including a trapezoidal-shape 902, a triangular-shape 904, a circular-shape 906, oval-shapes 908, 910, a square/rectangular-shape 912, a diamond-shape 914, as well as other suitable symmetrical or asymmetrical shapes. These resonant panels may be made from any suitable materials such as wood, metal, plastics, fiberglass, carbon fiber, other composites, honeycomb structures, etc.

As shown in FIG. 10, to promote acoustical transmission, laminated layers of different materials are used for constructing the resonant panels. In some embodiments, a resonant panel is comprised of a single material. For example, a resonant panel 1002 includes three layers 1004-1006 of different types of the same material (e.g., three different types of wood). In certain embodiments, a resonant panel is comprised of two or more different materials. For example, a resonant panel 1008 includes three layers of different materials such as a first layer 1010 comprising wood, a second layer 1011 comprising Nomex, and a third layer 1012 comprising carbon fiber. As an example, a resonant panel 1014 includes two layers of different materials such as a first layer 1016 comprising wood and a second layer 1017 comprising fiberglass.

FIGS. 11-15 show the construction of the top-side brace 130. According to some embodiments, the top-side brace 130 is a 5-layer lamination of spruce wood (3-layers) and carbon fiber (2-layers) with at least six receptacles 134. In some examples, the receptacles 134 are reinforced with carbon fiber pre-impregnated with resin to enable the transmission of available vibrations across the surface of the resonant panel without unnecessary kinetic losses and/or damping to the spectrum.

Figure 11:
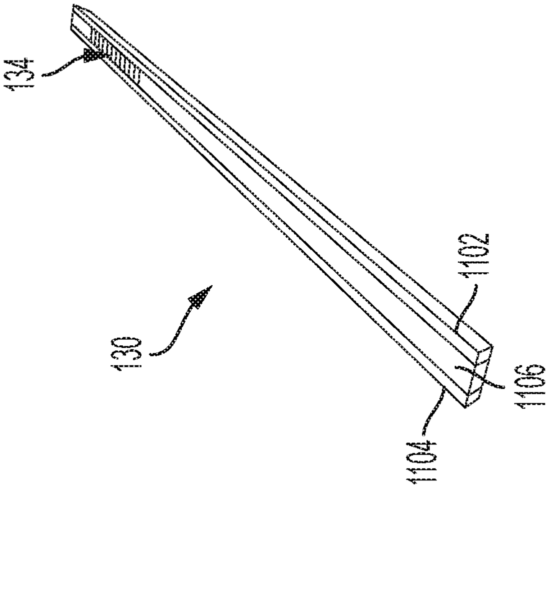
FIG. 11 illustrates a perspective view of a top-side brace.

To construct the top-side brace shown in FIG. 11, two side-layers 1102, 1104 are fabricated from spruce wood and laminated with carbon fiber (e.g., using a vacuum-bagging process). A center-layer 1106 is also fabricated from spruce wood and etched with grooves to form the receptacles 134 which may be plated with any suitable reinforcement material (e.g., carbon fiber, fiberglass, epoxy resin, etc.). The side-layers 1102, 1104 and the center-layer 1106 are then attached to one another to create the top-side brace 130. While FIG. 11 shows the center-layer 1106 as having six receptacles, any number of receptacles may be contemplated in other embodiments.

Figure 12:
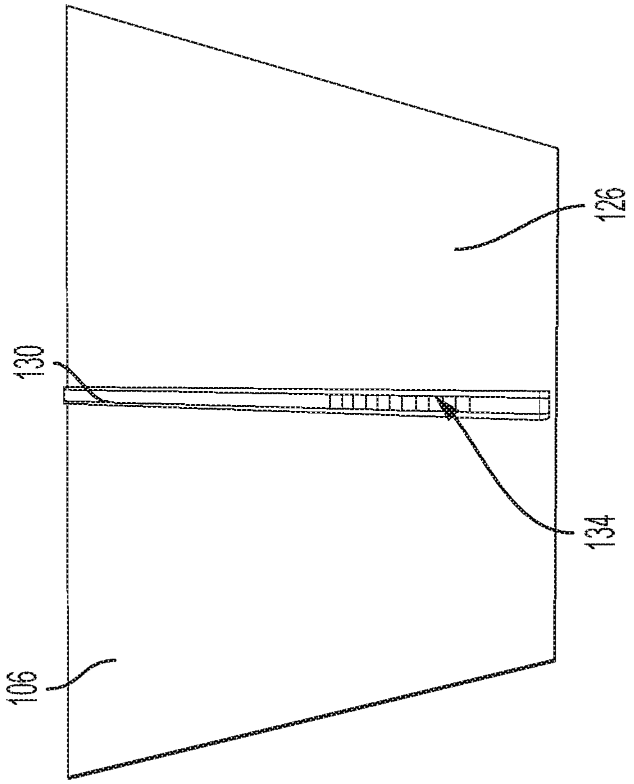
FIG. 12 illustrates a perspective view of the top-side brace of FIG. 11 coupled to a resonant panel.

In FIG. 12, the top-side brace 130 is coupled (e.g., via adhesives) to the top-side surface 126 of the resonant panel 106. The receptacles 134 are lined towards the narrow end of the trapezoidal-shaped resonant panel 106. This provides a mechanical advantage that favors higher partials more than lower frequencies to add clarity to the projected tone.

Figure 13:
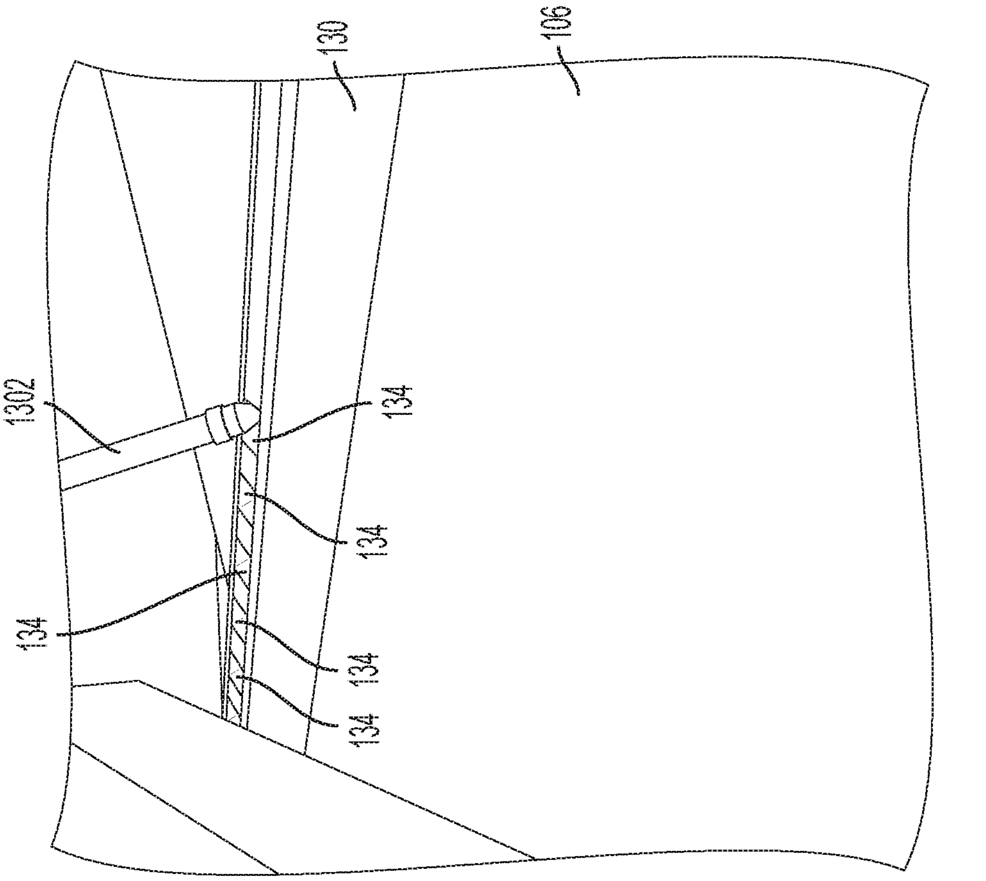
FIG. 13 illustrates a perspective view of a portion of a musical instrument coupled to a top-side brace.

FIG. 13 shows a cello endpin 1302 disposed in one of the receptacles 134 to couple a cello to the resonant panel 106. This interface between the cello and the resonant panel is important. Cellists are accustomed to forcing the endpin into the soft wood of a typical podium. While this is effective in preventing the cello from sliding away, the soft wood does not provide a good interface to transfer the vibrations, especially the upper harmonics, present in the endpin to the supporting surface of the podium.

Figure 14:
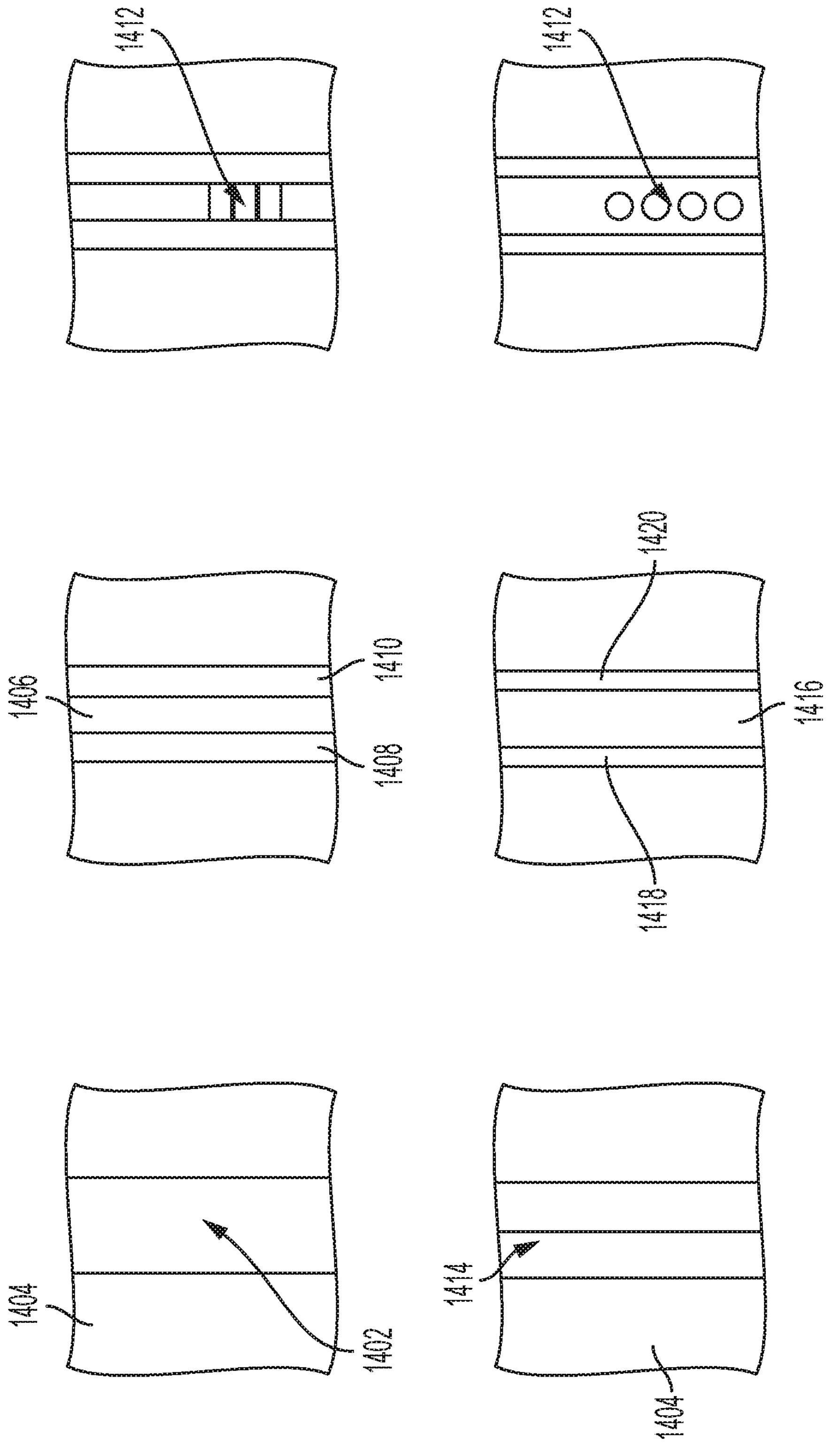
FIG. 14 illustrates different configurations of a top-side brace.
Figure 15:
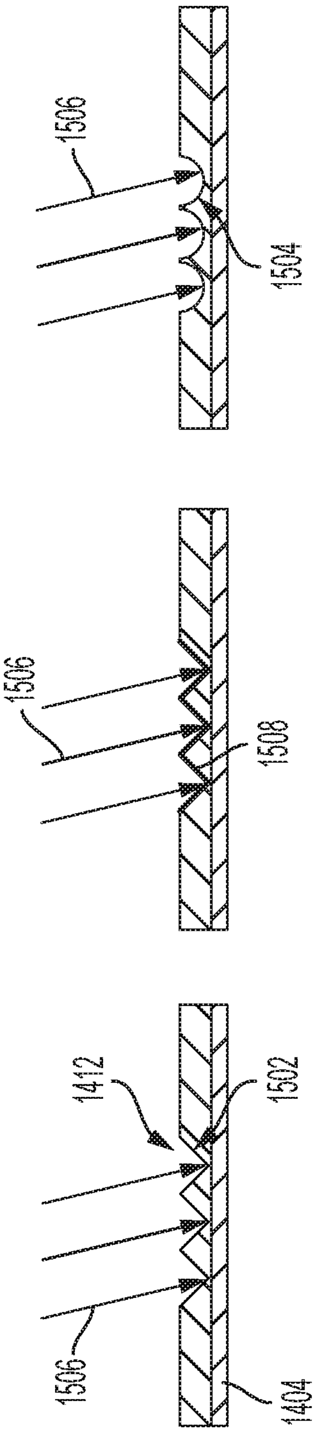
FIG. 15 illustrates different configurations of receptacles for a top-side brace.

Referring to FIGS. 14 and 15, different configurations of a top-side brace with different receptacle types are shown. The top-side brace is designed in a way to allow comfortable movements of the performer handling the musical instrument, while enabling the structurally-transmitted vibrations from the musical instrument to be transferred into the resonant panel. The top-side brace may be made from any suitable materials such as wood, metal, plastics, fiberglass, carbon fiber, other composites, honeycomb structures, etc. For example, as shown in FIG. 14, a top-side brace 1402, coupled to a resonant panel 1404, is made from a single material (e.g., wood) that includes a center-layer 1406 and side-layers 1408, 1410. A series of square-shaped receptacles 1412 are disposed on the center-layer 1406. Alternatively, a top-side brace 1414, coupled to the resonant panel 1404, is made from a combination of different materials, where a center layer 1416 is comprised of a first material (e.g., fiberglass) and side-layers 1418, 1420 are comprised of a second material (e.g., wood). Here, the receptacles 1412 disposed on the center layer 1416 are circular-shaped.

In FIG. 15, the receptacles 1412 are shown with different types of grooves, such as V-grooves 1502 and concave grooves 1504, configured to receive and support an instrument endpin 1506. In some embodiments, the V-grooves 1502 are laminated with a layer of reinforcement material 1508 (e.g., carbon fiber). The reinforcement material can also serve to prevent any slippage of the endpin. According to various embodiments, the receptacles include any form of a single or a series of grooves, cups, notches, holes, recesses, and/or other indentations.

Figure 16:
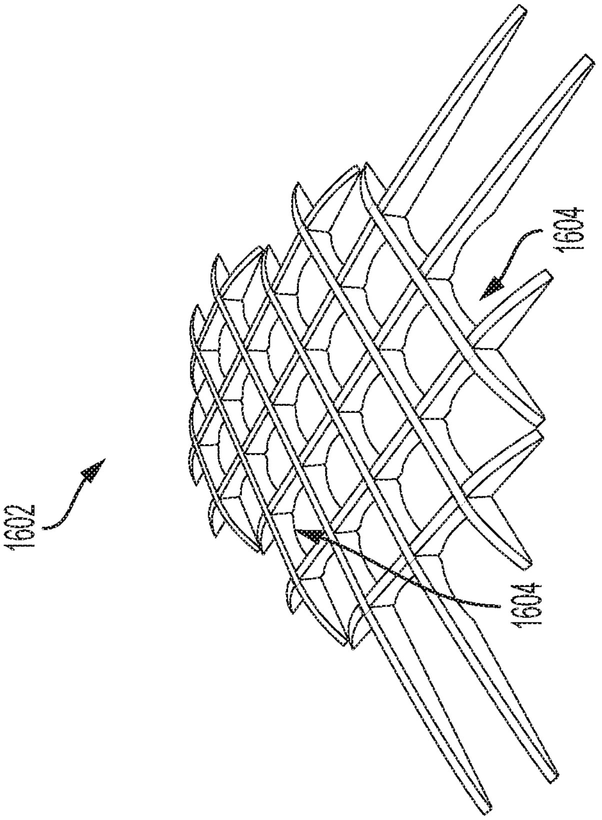
FIG. 16 illustrates a perspective view of a bottom-side brace in a lattice pattern.

FIGS. 16-19 show the construction of a bottom-side brace 1602 on the bottom-side surface 128 of the resonant panel 106. While bracing may not be necessary for any given resonant panel, braces with different shapes and/or materials can be used to promote desired acoustical properties. For example, when using a honeycomb structure or a multi-layered resonance panel, bracing may not be needed. In FIGS. 16 and 17, the bottom-side brace 1602 includes a plurality of individual braces intersecting one another in a lattice pattern ("lattice-style"). Each individual brace includes one or more scalloped cutaways 1604 on its under-side between where the individual braces intersect. This is done to reduce the overall weight while maintaining a high degree of rigidity. In FIG. 17, the "lattice-style" bottom-side brace 1602 is coupled (e.g., via adhesives) to the bottom-side surface 128 of the resonant panel 106. In some embodiments, prior to attachment, the "lattice-style" bottom-side brace 1602 is laminated with a layer of reinforcement material 1702 (e.g., carbon fiber).

Figure 18:
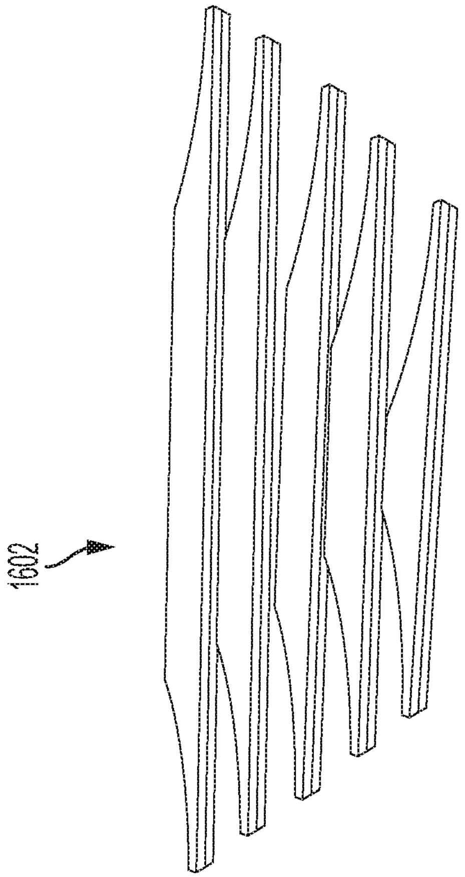
FIG. 18 illustrates a perspective view of a bottom-side brace in a parallel pattern.

In FIGS. 18 and 19, the bottom-side brace 1602 includes a plurality of individual braces arranged in a parallel pattern ("piano rib-style"). Each individual brace is made from a spruce/carbon/spruce laminate. Each individual brace has a tapered profile near the ends to allow for increased flexibility at the edges. In FIG. 19, the "piano rib-style" bottom-side brace 1602 is coupled to the bottom-side surface 128 of the resonant panel 106. Each brace is placed perpendicularly with respect to the bottom-side surface 128 in order to give rigidity while adding minimal mass. In some examples, a vacuum-bagging process is used to attach the "piano rib-style" bottom-side brace 1602 so that a consistent and even force is applied across each brace during the attachment to the resonant panel 106.

Figure 20:
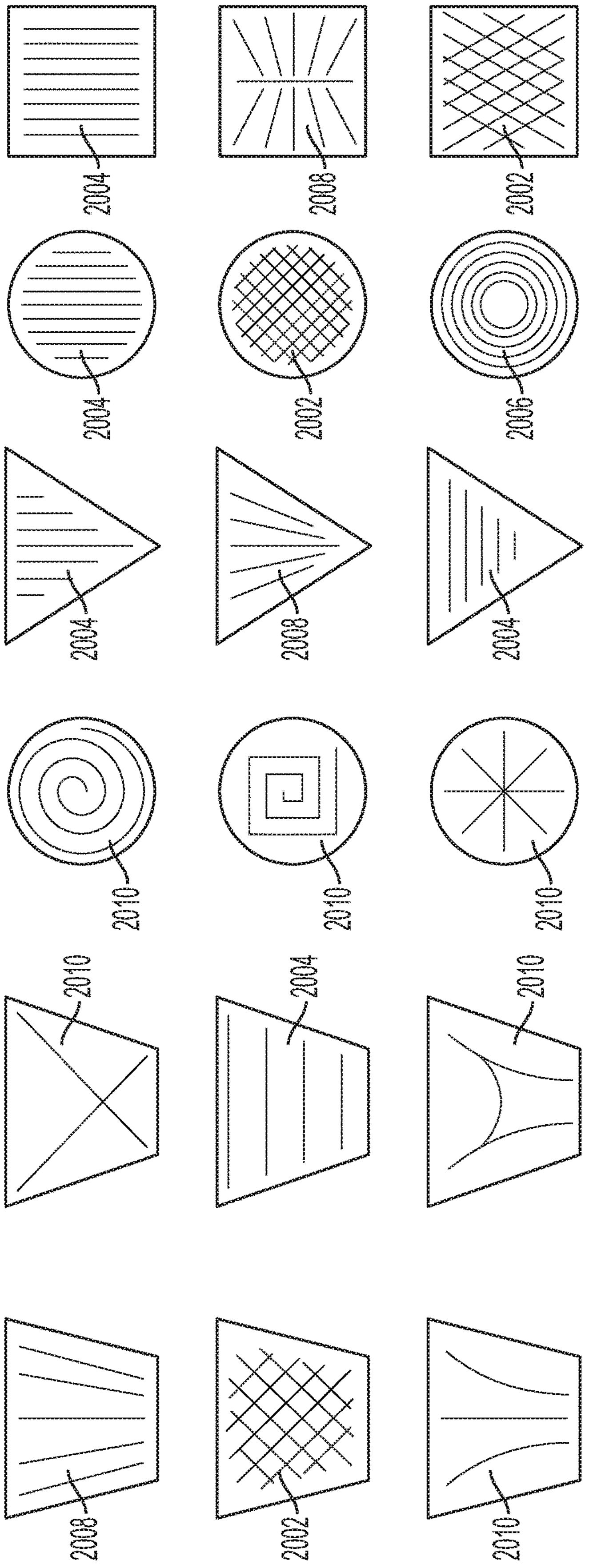
FIG. 20 illustrates different configurations of a bottom-side brace.

Referring to FIG. 20, different configurations of a bottom-side brace for different resonant panel shapes are shown including lattice patterns 2002, parallel patterns 2004, concentric patterns 2006, symmetric patterns 2008, asymmetric patterns 2010 (e.g., fan-shape, X-shape, curved-shape, star-shape, snail-shape, etc.), as well as other suitable patterns. These bottom-side braces may be made from any suitable materials such as wood, metal, plastics, fiberglass, carbon fiber, other composites, honeycomb structures, etc. Further, the width, length, and overall number of individual braces may be varied as desired to provide optimized outcomes for different musical instruments and/or musical contexts.

Figure 21:
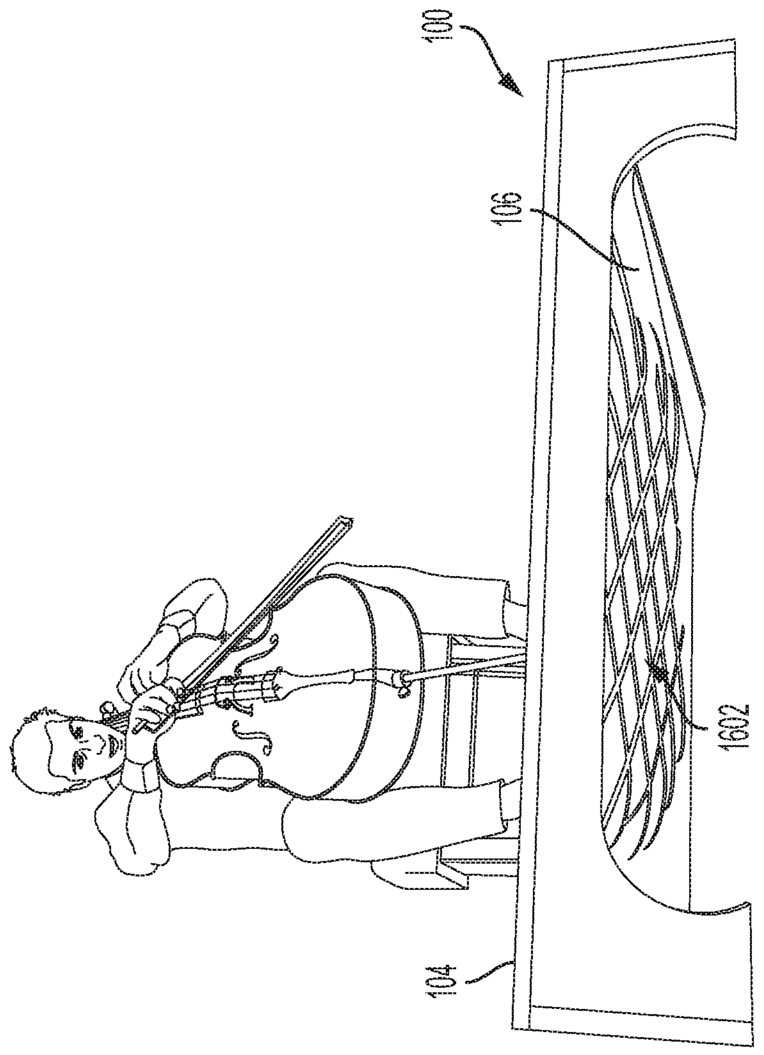
FIG. 21 illustrates a perspective view of a performer playing a musical instrument on a resonance podium.

FIG. 21 shows a performer in a sitting positions is playing a cello on the resonance podium 100. The endpin of the cello is coupled to the resonant panel 106. There are several formant areas that give the cello its unique sound. These include key frequencies at 250, 300-500, 600-900, and 2 kHz. By using the resonant panel 106 with the configurations seen in FIGS. 17 and 19, vibrations between 500 Hz and 2 kHz can be projected which adds presence and clarity to the sound of the cello. The resonance podium 100 can be adapted for use by an instrumental soloist and/or an entire section of instrumentalists.

According to various embodiments, operations are performed to make a resonance podium (e.g., 100). The operations may be performed manually or using automated assembly machines and fixtures. The operations begin by assembling a frame (e.g. 102) which includes a front wall (e.g., 108), a rear wall (e.g., 110), a first sidewall (e.g., 112), and a second sidewall (e.g., 114) (see FIG. 3). The operations continue by coupling a top panel (e.g., 104) to the frame to form a top surface that supports a performer playing a musical instrument on the resonance podium (see FIGS. 5 and 6). The operations proceed further by coupling a resonant panel (e.g., 106) to the frame (see FIGS. 1 and 2). The resonant panel is isolated from the top panel and configured to receive a portion of the musical instrument to project structurally-transmitted vibrations from the musical instrument for acoustical amplification (see FIG. 13). For example, the resonant panel is coupled to the frame via mounting rails (e.g., 402, 404) (see FIGS. 7 and 8).

According to some embodiments, the operations entail disposing a first brace (e.g., 130) on a first surface (e.g., 126) of the resonant panel (see FIG. 12). For example, the first brace includes an interface (e.g., 132) with a plurality of spaced-apart receptacles (e.g., 134) configured to receive the portion of the musical instrument.

According to certain embodiments, the operations entail disposing a plurality of second braces (e.g., 1602) on a second opposite surface (e.g., 128) of the resonant panel (see FIGS. 17 and 19). For example, the plurality of second braces are disposed on the second surface in a parallel pattern, a lattice pattern, a concentric pattern, a symmetric pattern, and/or an asymmetric pattern.

While the present disclosure has been described in a manner that establishes possession by the inventors and that enables those of ordinary skill in the art to make and use the same, it will be understood and appreciated that there are many equivalents to the embodiments disclosed herein and that various modifications, adaptations, and variations may be made thereto without departing from the scope and spirit of the present disclosure, which is to be limited not by the embodiments but by the appended claims.

What is claimed is:

1. A resonance podium comprising:

a frame comprising a plurality of walls;

a top panel supported by the plurality of walls of the frame to form a top surface that supports a performer playing a musical instrument on the resonance podium, the top panel including an opening; and a resonant panel disposed through and into the opening of the top panel, the resonant panel being supported by the plurality of walls and isolated from the top panel, the resonant panel configured to receive a portion of the musical instrument and to project structurally-transmitted vibrations from the musical instrument for acoustical amplification.

2. The resonance podium of claim 1, wherein:

the resonant panel includes a first surface opposite a second surface;

the first surface includes a first brace disposed along a length of the first surface; and the second surface includes a second brace having a plurality of braces disposed on the second surface in one or more of: a parallel pattern, a lattice pattern, a concentric pattern, a symmetric pattern, or an asymmetric pattern.

3. The resonance podium of claim 2, wherein:

the first brace includes an interface configured to receive the portion of the musical instrument;

the portion of the musical instrument is an endpin; and the interface includes a plurality of spaced-apart receptacles adapted for receiving the endpin to couple the musical instrument to the resonant panel.

4. The resonant podium of claim 1, wherein at least one of the plurality of walls includes an opening.

5. The resonant podium of claim 1, wherein:

the plurality of walls include a front wall, a rear wall, a first sidewall, and a second sidewall;

the first sidewall includes a first sidewall opening disposed through the first sidewall;

the second sidewall including a second sidewall opening disposed through the second sidewall; and the front wall including a front wall opening disposed through the front wall.

6. The resonance podium of claim 1, wherein the resonant panel is comprised of a single material.

7. The resonance podium of claim 1, wherein the resonant panel is comprised of two or more layers of different materials.

8. The resonance podium of claim 1, wherein the resonant panel is integrated with the frame of the resonance podium.

9. The resonance podium of claim 1, wherein the resonant panel is a separate piece attachable to the frame of the resonance podium.

10. The resonance podium of claim 1, wherein the top panel includes a chair rail disposed above the rear wall.

11. The resonance podium of claim 5, wherein:

the resonant panel is coupled to the plurality of walls via mounting rails;

the plurality of walls including one or more internal walls; and the mounting rails are disposed between the front wall and the one or more internal walls.

12. The resonance podium of claim 2, wherein the second brace is coated with a reinforcement material.

13. A resonant panel comprising:

a first surface, the first surface including a first brace disposed along a length of the first surface and configured to receive a portion of a musical instrument;

a second surface opposite the first surface; and wherein the resonant panel is configured to:

couple to a resonance podium that supports a performer playing the musical instrument; and project structurally-transmitted vibrations from the musical instrument for acoustical amplification.

14. The resonant panel of claim 13, wherein the second surface includes a second brace, the second brace having a plurality of braces disposed on the second surface in one or more of: a parallel pattern, a lattice pattern, a concentric pattern, a symmetric pattern, or an asymmetric pattern.

15. The resonant panel of claim 13, wherein the portion of the musical instrument is an endpin, and the first brace includes a plurality of spaced-apart receptacles adapted for receiving the endpin.

16. The resonant panel of claim 14, wherein the second brace is coated with a reinforcement material.

17. A method of making a resonance podium comprising:

assembling a frame of the resonance podium, the frame including a front wall, a rear wall, a first sidewall, and a second sidewall;

coupling a top panel including an opening to the frame to form a top surface that supports a performer playing a musical instrument on the resonance podium; and disposing a resonant panel through and into the opening of the top panel of the frame, the resonant panel being isolated from the top panel and configured to receive a portion of the musical instrument to project structurally-transmitted vibrations from the musical instrument for acoustical amplification.

18. The method of claim 17, further comprising disposing a first brace on a first surface of the resonant panel, the first brace including an interface with a plurality of spaced-apart receptacles configured to receive the portion of the musical instrument.

19. The method of claim 17, further comprising disposing a plurality of second braces on a second opposite surface of the resonant panel, the plurality of second braces being disposed on the second surface in one or more of: a parallel pattern, a lattice pattern, a concentric pattern, a symmetric pattern, or an asymmetric pattern.

20. The resonance podium of claim 11, wherein the mounting rails are configured to support the resonant panel in a sloped configuration beneath the top panel.

* * * * *